United States Patent
Oshita et al.

(10) Patent No.: US 8,188,173 B2
(45) Date of Patent: May 29, 2012

(54) POLYVINYL ACETAL POWDER COATING MATERIAL

(75) Inventors: Shinya Oshita, Kurashiki (JP); Yuhi Shimazumi, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 12/863,378

(22) PCT Filed: Dec. 17, 2008

(86) PCT No.: PCT/JP2008/073009
§ 371 (c)(1),
(2), (4) Date: Jul. 16, 2010

(87) PCT Pub. No.: WO2009/090827
PCT Pub. Date: Jul. 23, 2009

(65) Prior Publication Data
US 2010/0311881 A1 Dec. 9, 2010

(30) Foreign Application Priority Data

Jan. 16, 2008 (JP) ................. 2008-006571

(51) Int. Cl.
*C08K 5/00* (2006.01)
*C08K 5/09* (2006.01)
*C08G 18/77* (2006.01)

(52) U.S. Cl. ......... 524/222; 524/299; 524/115; 524/155

(58) Field of Classification Search .................. 524/222, 524/115, 155, 299
See application file for complete search history.

(56) References Cited

U.S. PATENT DOCUMENTS

| 5,143,950 | A | 9/1992 | Kitagawa et al. |
| 5,153,239 | A | 10/1992 | Kitagawa et al. |
| 5,259,992 | A | 11/1993 | Bennett |
| 5,795,927 | A * | 8/1998 | Decker et al. ................. 523/401 |
| 6,605,658 | B1 * | 8/2003 | Broussard et al. ............ 524/106 |
| 2002/0161090 | A1 * | 10/2002 | Blok ............................ 524/425 |
| 2003/0186091 | A1 * | 10/2003 | Van Benthem et al. ....... 428/704 |
| 2004/0065403 | A1 * | 4/2004 | Hattori et al. ................. 156/230 |
| 2004/0138357 | A1 | 7/2004 | Chin |
| 2006/0073312 | A1 * | 4/2006 | Hattori ....................... 428/195.1 |
| 2006/0292465 | A1 * | 12/2006 | Yamada et al. ................. 430/56 |
| 2009/0311547 | A1 | 12/2009 | Tanimoto et al. |

FOREIGN PATENT DOCUMENTS

| JP | 63 193970 | 8/1988 |
| JP | 4 358145 | 12/1992 |
| JP | 5 171069 | 7/1993 |
| JP | 2000 281966 | 10/2000 |
| JP | 2004 75705 | 3/2004 |
| JP | 2004 527624 | 9/2004 |
| JP | 2005 179581 | 7/2005 |
| JP | 2007 302847 | 11/2007 |

OTHER PUBLICATIONS

Extended Search Report issued Feb. 2, 2011 in Europe Application No. 08870809.4.

* cited by examiner

*Primary Examiner* — Milton I Cano
*Assistant Examiner* — John Uselding
(74) *Attorney, Agent, or Firm* — Oblon, Spivak, McClelland, Maier & Neustadt, L.L.P.

(57) ABSTRACT

The present invention provides a polyvinyl acetal powder coating material capable of forming a coating film having a highly smooth surface, being less susceptible to yellowing when exposed to heat, and being suitable for working such as bending of a coated article. The present invention is a polyvinyl acetal powder coating material including: a polyvinyl acetal resin; and 0.02 to 5% by weight of an antioxidant relative to the polyvinyl acetal resin. The antioxidant has a molecular weight of 380 to 1000 and a melting point of 80 to 230° C. It is preferable that the molecular weight of the antioxidant be 400 to 1000.

16 Claims, No Drawings

POLYVINYL ACETAL POWDER COATING MATERIAL

TECHNICAL FIELD

The present invention relates to a polyvinyl acetal powder coating material. The present invention also relates to a coating film obtained by applying the polyvinyl acetal powder coating material. The present invention further relates to a cart coated with the polyvinyl acetal powder coating material.

BACKGROUND ART

Conventionally, resins such as polyethylene, polyamide, epoxy resin, and polyvinyl chloride are used as resins for powder coating to protect metal substrates or the like from rust, solvents, etc. Recently, in particular, the use of organic solvent-based coating materials has been avoided from the viewpoint of environmental load, and non-solvent-based coating has replaced such solvent-based coating at an accelerated pace. Even water-based coating cannot eliminate the use of organic solvents completely, and has difficulties in coating workability. In addition, water-based coating still has a problem of effluent treatment. In contrast, powder coating does not require the use of any solvents, and in addition, it is expected in terms of, for example, an increase in production rate and a cost reduction.

Among the powder coating materials, polyamide powder coating materials are highly valued because of their excellent impact resistance. The polyamide powder coating materials have, however, insufficient adhesion to substrates, and the surface of the metal needs to be subjected to pretreatment such as primer coating before coating. In addition, they are disadvantageous in that the hardness of the resulting coating films is lower.

On the other hand, polyvinyl acetal powder coating materials have been developed as powder coating materials capable of forming coating films having good adhesion to substrates, high impact resistance, and high hardness. For example, JP 63 (1988)-193970 A (the scope of claims for patent) proposes an epoxy resin powder coating material containing 100 parts by weight of an epoxy resin, which is a thermosetting resin, 5 to 20 parts by weight of polyvinyl butyral or polyvinyl formal, and further a curing agent and a filler. JP 2000-281966 A (the scope of claims for patent) proposes a powder coating material composed of a hydrophobic resin (such as polyvinyl butyral) and a water-absorbent resin (such as polyacrylic acid salt).

However, the polyvinyl acetal powder coating materials as mentioned above do not necessarily have good smoothness when the substrate temperatures are low. They also may cause coating defects such as pinholes. Therefore, the substrates are heated after the coating, if necessary, but the heating conditions such as long time heating and high temperature heating accelerate the deterioration of the resin, which may yellow the coating films. Furthermore, many of the polyvinyl acetal powder coating materials having low melt flow rates (MFR) do not improve their smoothness due to pinholes or the like even if they are subjected to post-heating or applied at high temperatures.

Some of the substrates have complex final shapes, and such substrates are bent for assembly after the coating in some cases. In such cases, if the coating films have poor flexibility, they may crack or peel off in the bent portions when the substrates are bent.

DISCLOSURE OF THE INVENTION

The present invention has been made in order to solve the above conventional problems, and it is an object of the present invention to provide a polyvinyl acetal powder coating material capable of forming a coating film having a highly smooth surface, being less susceptible to yellowing when exposed to heat, and being suitable for working such as bending of a coated article. It is another object of the present invention to provide a coating film of a polyvinyl acetal powder coating material, having high smoothness, showing very little yellowing, and having high flexibility. It is a further object of the present invention to provide a cart coated with a highly smooth coating film with few pinholes, showing very little yellowing, and having a good appearance with no cracks in a bent portion.

The present invention that has achieved the above objects is a polyvinyl acetal powder coating material including: a polyvinyl acetal resin; and 0.02 to 5% by weight of an antioxidant relative to the polyvinyl acetal resin. The antioxidant has a molecular weight of 380 to 1000 and a melting point of 80 to 230° C.

The present invention also is a coating film obtained by applying the polyvinyl acetal powder coating material.

The present invention further is a cart coated with the polyvinyl acetal powder coating material.

The powder coating material of the present invention forms a coating film having a highly smooth surface with few coating defects such as running or sagging and pinholes even when exposed to high-temperature coating or long-time post-heating. The coating film is less susceptible to yellowing in a wide range of coating temperatures including low and high temperatures. The high flexibility of the coating film contributes to the high resistance to cracking and peeling of the coating film even when the substrate is worked after being coated. A coating film obtained by applying the powder coating material of the present invention has high smoothness, shows very little yellowing, and has high flexibility. A cart coated with the powder coating material of the present invention has a highly smooth coating film with few pinholes, shows very little yellowing, and has a good appearance with few cracks and peelings in a bent portion.

BEST MODE FOR CARRYING OUT THE INVENTION

What is important for the present invention is that 0.02 to 5% by weight of an antioxidant is added to the polyvinyl acetal resin. When the content of the antioxidant is less than 0.02% by weight, the flexibility of the coating film decreases, as is clear from Comparative Examples described later. On the other hand, when the content of the antioxidant exceeds 5% by weight, the smoothness of the coating film decreases, which may cause running or sagging of the coating material or pinholes in the coating film. The preferable content of the antioxidant is 0.05 to 3% by weight.

In order to achieve the objects of the present invention, it is also necessary that the antioxidant has a molecular weight of 380 to 1000 and a melting point of 80 to 230° C. The use of the antioxidant having a molecular weight of at least 380 further improves the flexibility of the coating film and makes it more resistant to cracking and peeling. The use of such an antioxidant also improves the flowability of the molten resin, which further improves the smoothness. Preferably, the lower limit of the molecular weight is at least 400, and more preferably, at least 600. When the molecular weight exceeds 1000, the smoothness may be deteriorated due to poor compatibility. From the viewpoint of handling, the upper limit of the molecular weight of the antioxidant used in the present invention needs to be 1000 or less, and preferably, it is 800 or less.

The use of the antioxidant having a melting point of 80 to 230° C. further improves the flexibility and the smoothness, and makes it more resistant to yellowing. Such an antioxidant can be dry-blended with a polyvinyl acetal resin, which enables lower-cost production than melt-kneading, etc. The melting point of the antioxidant is preferably 90 to 180° C.

Examples of antioxidants that can be preferably used in the present invention include hindered phenol antioxidants such as hexamethylene-bis[3-(3,5-di-t-butyl-4-hydroxyphenyl) propionate] ("IRGANOX 259" manufactured by Ciba Specialty Chemicals, Inc.), 3,9-bis{1,1-dimethyl-2-[β-(3-t-butyl-4-hydroxy-5-methylphenyl)propionyloxy)ethyl}2, 4,8, 10-tetraoxaspiro[5,5]-undecane ("Adeka Stub AO-80" manufactured by ADEKA Corporation), N,N'-hexane-1,6-diylbis[3-(3,5-di-t-butyl-4-hydroxyphenyl)propionamide] ("IRGANOX 1098" manufactured by Ciba Specialty Chemicals, Inc.), 1,3,5-tris(4-t-butyl-3-hydroxy-2,6-xylylmethyl-1, 3,5-triazine-2,4,6-(1H,3H,5H)-trione ("IRGANOX 3790" manufactured by Ciba Specialty Chemicals, Inc.), 2,6-di-t-butyl-4-[4,6-bis(octylthio)-1,3,5-triazinylamino]phenol ("IRGANOX 565" manufactured by Ciba Specialty Chemicals, Inc.), 1,3,5-tris(3,5-di-t-butyl-4-hydroxybenzyl)-1,3,5-triazine-2,4,6-(1H, 3H, 5H)-trione ("IRGANOX 3114" manufactured by Ciba Specialty Chemicals, Inc.), and 4,4'-butylidenebis(6-t-butyl-3-methylphenol) ("Sumilizer BBM-S" manufactured by Sumitomo Chemical Co., Ltd.).

It is preferable, from the viewpoint of the chemical structure, that the antioxidant be a compound represented by the following general formula (1):

[Chemical Formula 1]

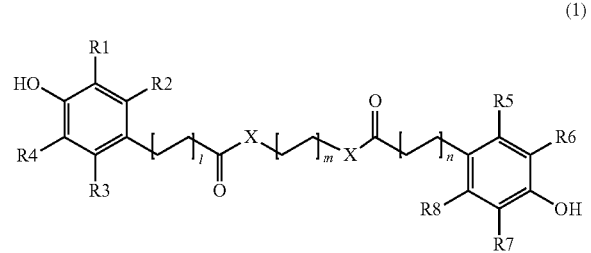

(1)

where R1 to R8 each represent a hydrogen atom, or a linear or branched alkyl group having 1 to 4 carbon atoms, l, m, and n each represent an integer from 1 to 10, and X represents a heteroatom of N or O. Examples of linear or branched alkyl groups having 1 to 4 carbon atoms include methyl, ethyl, propyl, i-propyl, n-butyl, i-butyl, and t-butyl.

Among these antioxidants, hexamethylene-bis[3-(3,5-di-t-butyl-4-hydroxyphenyl)propionate] ("IRGANOX 259" manufactured by Ciba Specialty Chemicals, Inc.) and N,N'-hexane-1,6-diylbis[3-(3,5-di-t-butyl-4-hydroxyphenyl)propionamide] ("IRGANOX 1098" manufactured by Ciba Specialty Chemicals, Inc.) are the best ones because they can achieve the objects of the present invention more effectively. Two or more of the above antioxidants also can be used in combination. The combined use of two or more of the antioxidants sometimes further improves the advantageous effects of the present invention.

The following additives may be used optionally in addition to the above antioxidants as long as the properties of the present invention are not impaired: phosphorus heat stabilizers such as tris(2,4-di-t-butylphenyl)phosphate ("IRGAFOS 16" manufactured by Ciba Specialty Chemicals, Inc.), bis[2, 4-bis(1,1-dimethylethyl)-6-methylphenyl]phosphorous acid ethyl ester ("IRGAFOS 38" manufactured by Ciba Specialty Chemicals, Inc.), and phosphonite ("IRGAFOS P-EPQ"); hydroxylamine heat stabilizers such as N,N-dioctadecylhydroxylamine ("IRGASTAB FS 042" manufactured by Ciba Specialty Chemicals, Inc.); sulfur heat stabilizers such as dioctadecyl-3,3'-thiodipropionate ("IRGANOX PS 802" manufactured by Ciba Specialty Chemicals, Inc.); and other antioxidants such as pentaerythritol tetrakis[3-(3,5-di-t-butyl-4-hydroxyphenyl)propionate] ("IRGANOX 1010" manufactured by Ciba Specialty Chemicals, Inc.), triethylene glycol-bis-[3-(3-t-butyl-4-hydroxy-5-methylphenypropionate] ("IRGANOX 245" manufactured by Ciba Specialty Chemicals, Inc.), 3,3','', 5,5',5''-hexa-t-butyl-α,α',α''-(mesitylene-2, 4,6-triyl)tri-p-cresol ("IRGANOX 1330" manufactured by Ciba Specialty Chemicals, Inc.), n-octadecyl-β-(4'-hydroxy-3',5'-di-t-butylphenyl)propionate ("IRGANOX 1076" manufactured by Ciba Specialty Chemicals, Inc., "Adeka Stub AO-50", etc.), diethyl{[3,5-bis(1,1-dimethylethyl)-4-hydroxyphenyl]methyl}phosphonate ("IRGAMOD 295" manufactured by Ciba Specialty Chemicals, Inc.) thiodiethylenebis[3-(3,5-di-t-butyl-4-hydroxyhydrocinnamate)] ("IRGANOX 1035" manufactured by Ciba Specialty Chemicals, Inc.), and a mixture of calcium bis[ethyl(3,5-di-t-butyl-4-hydroxylbenzyl)phosphonate] and polyethylene wax ("IRGANOX 1425 WL" manufactured by Ciba Specialty Chemicals, Inc.). Two or more of the above heat stabilizers and antioxidants also can be used in combination. The combined use of two or more of them sometimes further improves the advantageous effects of the present invention.

In order to achieve the objects of the present invention, it is more preferable that the antioxidant have an average particle diameter of 150 μm or less and a maximum particle diameter of 250 μm or less. The average particle diameter of the antioxidant is preferably 130 μm or less, and more preferably 100 μm or less. The antioxidant having a desired particle diameter can be obtained by, for example, grinding granules or pellets. The average particle diameter and maximum particle diameter of the antioxidant are determined in the same manner as the average particle diameter and maximum particle diameter of agglomerated particles of a polyvinyl acetal resin described later.

In order to achieve the objects of the present invention, it is more preferable that the polyvinyl acetal resin used in the present invention be a polyvinyl acetal resin having a water content of 2.5% by weight or less, and an aldehyde content of 1000 ppm by weight or less.

When the water content is 2.5% by weight or less, the smoothness of the coating film obtained by applying the powder coating material of the present invention is further improved. More preferably, the water content is 2% by weight or less. The lower limit of the water content is preferably at least 0.1% by weight, and more preferably at least 0.5% by weight. Examples of the method for adjusting the water content to this range of values include a method in which the water content is reduced to a prescribed value or less by drying after washing an acetalized product with water or a mixed solution of water and alcohol.

When the residual aldehyde content is 1000 ppm by weight or less, the coating film obtained by applying the powder coating material of the present invention has fewer pinholes, and yellowing thereof further can be prevented. The residual aldehyde content is more preferably 500 ppm by weight or less, and further preferably 120 ppm by weight or less. The lower limit of the residual aldehyde content is preferably at least 5 ppm by weight, and more preferably at least 10 ppm by weight. Examples of the method for adjusting the aldehyde content to this range of values include a method in which the aldehyde content is reduced to a prescribed value or less by purifying polyvinyl acetal through washing with water or a mixed solution of water and alcohol.

The polyvinyl acetal resin used in the present invention generally is produced using a vinyl alcohol polymer as a raw material. The vinyl alcohol polymer can be obtained by a conventional known method, that is, by polymerizing vinyl ester monomers and saponifying the obtained polymer. In order to polymerize vinyl ester monomers, conventional known methods such as solution polymerization, bulk polymerization, suspension polymerization, and emulsion polymerization can be used. As a polymerization initiator, azo initiators, peroxide initiators, redox initiators, and the like may be selected appropriately depending on the polymerization method. For the saponification reaction, conventional known methods such as alcoholysis and hydrolysis using an alkali catalyst or an acid catalyst can be used. Among them, saponification reaction using methanol as a solvent and caustic soda (NaOH) as a catalyst is most preferred because of its simplicity.

Examples of the vinyl ester monomers include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate, and vinyl acetate is particularly preferred.

When the vinyl ester monomers are polymerized, they may be copolymerized with other monomers as long as the objects of the present invention are not impaired. Examples of the other monomers include: α-olefins such as ethylene, propylene, n-butene, and isobutylene; acrylic acid and its salts; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate, and octadecyl acrylate; methacrylic acid and its salts; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate, and octadecyl methacrylate; acrylamide and acrylamide derivatives such as N-methylacrylamide, N-ethylacrylamide, N,N-dimethylacrylamide, diacetone acrylamide, acrylamide propanesulfonic acid and its salts, acrylamide propyldimethylamine and its acid salts or its quaternary salts, and N-methylol acrylamide and its derivatives; methacrylamide and methacrylamide derivatives such as N-methylmethacrylamide, N-ethylmethacrylamide, methacrylamide propanesulfonic acid and its salts, methacrylamide propyldimethylamine and its acid salts or its quaternary salts, and N-methylol methacrylamide and its derivatives; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile and methacrylonitrile; vinyl halides such as vinyl chloride and vinyl fluoride; vinylidene halides such as vinylidene chloride and vinylidene fluoride; allyl compounds such as allyl acetate and allyl chloride; maleic acid and its salts or its esters or its anhydrides; vinylsilyl compounds such as vinyltrimethoxysilane; and isopropenyl acetate. These monomers usually are used in an amount of less than 10 mol % relative to vinyl ester monomers.

The acid catalyst to be used for acetalization is not particularly limited. Both organic acids and inorganic acids can be used. Examples of the acid catalyst include acetic acid, p-toluenesulfonic acid, nitric acid, sulfuric acid, and hydrochloric acid. Among these acids, hydrochloric acid, sulfuric acid and nitric acid are used preferably, and hydrochloric acid is used particularly preferably.

In the present invention, it is preferable to use a polyvinyl acetal resin obtained by acetalizing a vinyl alcohol polymer (particularly polyvinyl alcohol) with an aldehyde having 2 to 6 carbon atoms. Examples of the aldehyde having 2 to 6 carbon atoms include acetaldehyde, propionaldehyde, n-butylaldehyde, isobutylaldehyde, n-hexylaldehyde and 2-ethylbutylaldehyde. They may be used alone, or two or more of them may be used in combination. Among them, preferred is an aldehyde having 4 to 6 carbon atoms, and particularly preferred is n-butylaldehyde. As polyvinyl acetal resins to be used in the present invention, polyvinyl acetal resins using an aldehyde having 2 to 6 carbon atoms, in particular, an aldehyde having 4 to 6 carbon atoms, are preferred. Among them, a polyvinyl butyral resin using n-butyl aldehyde is preferred.

The degree of acetalization of the polyvinyl acetal resin used in the present invention is preferably 40 to 85 mol %, and further preferably 50 to 85 mol %. When the degree of acetalization is in this range, the obtained coating material has excellent flowability, is capable of forming a coating film having a uniform thickness, and further has good adhesion to the substrate. In order to achieve the objects of the present invention more effectively, it is preferable that the content of vinyl ester units in the polyvinyl acetal resin is 0.1 to 30 mol % and the content of vinyl alcohol units therein is 10 to 50 mol %.

It should be noted that the above values of the degree of acetalization, the content of vinyl ester units, and the content of vinyl alcohol units are, respectively, the percentages relative to the total of the degree of acetalization (the content of vinyl acetal units), the content of vinyl ester units, and the content of vinyl alcohol units.

The degree of polymerization of the vinyl alcohol polymer as a raw material of the polyvinyl acetal resin used in the present invention is selected appropriately from the range of 150 to 2000. The degree of polymerization of the vinyl alcohol polymer is preferably 200 to 1700, and further preferably 250 to 1000.

The polyvinyl acetal resin used in the present invention may contain a functional group such as a carboxyl group, a primary hydroxyl group, an epoxy group, an amino group, and an isocyanate group, in its molecule. There is no particular limitation on the method of introducing the functional group into the molecule. Examples of the method includes: (1) a method of polymerizing an ethylenically unsaturated monomer having a carboxyl group or a primary hydroxyl group, such as (meth)acrylic acid or hydroxyethyl (meth) acrylate, in an aqueous solution of a vinyl alcohol polymer to graft the monomer onto the vinyl alcohol polymer, and then acetalyzing the resulting graft polymer; (2) a method of acetalizing a vinyl alcohol polymer containing a carboxyl group or a vinyl alcohol polymer containing an amino group; and (3) a method of acetalizing a vinyl alcohol polymer with an aldehyde compound having a calboxyl group, such as glyoxylic acid.

It is preferable that the polyvinyl acetal resin used in the present invention be in the form of agglomerated particles of primary particles. It is further preferable that the average particle diameter of the primary particles be 5 μm or less and the maximum particle diameter thereof be 10 μm or less. It is preferable that the average particle diameter of the agglomerated particles be 150 μm or less and the maximum particle diameter thereof be 250 μm or less. Specifically, the average particle diameter of the agglomerated particles is preferably 130 μm or less, and more preferably 100 μm or less. As stated herein, a primary particle is a particle that is formed first during the acetalization reaction of the vinyl alcohol polymer.

It is preferable that the polyvinyl acetal resin satisfy these specific conditions of the primary particle diameter and the agglomerated particle diameter because such a polyvinyl acetal resin allows the obtained powder coating material to have excellent adhesion to the substrate and the resulting coating film to have high hardness, and further allows the powder coating material to have excellent flowability and the coating film to have a uniform thickness.

The average particle diameter of the agglomerated particles of the polyvinyl acetal resin can be determined by a laser diffraction measurement. For example, a particle size distribution analyzer SALD-2200 manufactured by Shimadzu Corporation or the like can be used for the measurement. The maximum particle diameter of the agglomerated particles can be determined from the endpoint of the particle size distribution obtained by the measurement.

The average particle diameter of the primary particles can be obtained in the following manner. Pictures of three portions of the polyvinyl acetal resin (three pictures thereof) are taken with a scanning electron microscope (SEM) at a magnification of 1000. Then, the diameters of the primary particles that can be determined based on each of the pictures (at least 50 particles for each picture) are measured to calculate the average value thereof. As the diameter of each primary particle, the longest diameter thereof is measured. The maximum particle diameter of the primary particles is the maximum particle diameter of the primary particles that can be observed in the above SEM pictures.

The polyvinyl acetal resin having these specific primary particle diameter and agglomerated particle diameter can be obtained by the following method, for example.

First, an aqueous solution of a vinyl alcohol polymer with a concentration of 3 to 15% by weight is prepared at a temperature of 80 to 100° C., and slowly cooled over a period of 10 to 60 minutes. When the aqueous solution is cooled to a temperature of −10 to 30° C., aldehyde and a catalyst are added. The resulting mixture is maintained at a constant temperature for 30 to 200 minutes so as to proceed the reaction. The temperature of the reaction mixture further is raised over a period of 30 to 200 minutes to 40 to 80° C. and is maintained at that temperature for about 1 to 3 hours, followed by cooling, water washing, an addition of a netralizer (such as an alkali neutralizer), and drying. Thus, the intended polyvinyl acetal resin is obtained. In this method, agglomerated particles having a maximum particle diameter of more than 250 µm are rarely produced. When agglomerated particles having a maximum particle diameter of more than 250 µm are produced, it is preferable that such large particles be removed by filtering.

The powder coating material of the present invention can be obtained by dry-blending the above polyvinyl acetal resin and an antioxidant, or by mixing and melting the above polyvinyl acetal resin and the antioxidant and then grinding the mixture. In terms of production costs, it is preferable that the powder coating material of the present invention be a dry blend of the polyvinyl acetal resin and the antioxidant.

Further blending of inorganic fine particles in the powder coating material of the present invention also is a preferred embodiment because the blending thereof improves the flowability of the powder coating material, the ability to flow into small spaces and the adhesion to the substrate, and further improves the hardness of the resulting coating film. Preferable examples of the inorganic fine particles include silica and aluminum oxide.

In order to achieve the objects of the present invention, it is more preferable that the inorganic fine particles have an average particle diameter of 1 µm or less.

The average particle diameter of the inorganic fine particles is preferably 0.5 µm or less, and more preferably 0.1 µm or less. The inorganic fine particles having a desired particle diameter can be obtained by, for example, pulverizing an inorganic substance. The average particle diameter of the inorganic fine particles can be determined in the same manner as the above-mentioned average particle diameter of the agglomerated particles of the polyvinyl acetal resin. The inorganic fine particles are preferably blended in an amount of 0.0001 to 2% by weight of the polyvinyl acetal resin, and more preferably 0.001 to 1% by weight thereof.

Furthermore, in the present invention, blending of surface control agents such as a leveling agent and a defoaming agent is a preferred embodiment because the blending thereof provides the powder coating material with an improved ability to flow into small spaces and adhesion to the substrate, and further reduces the occurrence of pinholes and defects to improve the smoothness of the surface of the resulting coating film. Examples of the surface control agents include acrylic, vinyl, silicone, and fluorine polymer additives, and benzoin.

It is preferable that the average particle diameter of the surface control agent be 150 µm or less and the maximum particle diameter thereof be 250 µm or less. In order to achieve the objects of the present invention, the average particle diameter of the surface control agent is preferably 130 µm or less, and more preferably 100 µm or less. The surface control agent having a desired particle diameter can be obtained by, for example, grinding granules. The average particle diameter and maximum particle diameter of the surface control agent are determined in the same manner as the above-mentioned average particle diameter and maximum particle diameter of agglomerated particles of the polyvinyl acetal resin. The surface control agent is blended in an amount of preferably 0.001 to 10% by weight of the polyvinyl acetal resin, and more preferably 0.01 to 5% by weight thereof.

In the present invention, an ultraviolet absorber and the like also can be added as appropriate.

A curing agent such as an isocyanate compound, an epoxy compound, hydroxyalkylamide, an amino compound, an aliphatic dibasic acid, and an acid anhydride can be added further into the powder coating material of the present invention. The amount of the curing agent to be used is usually 20% by weight or less of the polyvinyl acetal resin, preferably 15% by weight or less, and more preferably 10% by weight or less. The use of the curing agent in an amount of this range allows the obtained coating film to have improved resistance to solvents and the like.

There is no particular limitation on the above-mentioned isocyanate compound. Blocked isophorone diisocyanate compounds are used preferably. Among them, ε-caprolactam-blocked isophorone diisocyanate blocked with a blocking agent such as ε-caprolactam, and uretdione bond-containing isocyanate that is self-blocked isocyanate are preferred. Examples of this ε-caprolactam-blocked isophorone diisocyanate include "VESTAGON B-1530" manufactured by Huls Corporation and "CRELAN (registered trademark) U-1" manufactured by Bayer Corporation. Examples of the uretdione bond-containing isocyanate include "VESTAGON BF-1540" manufactured by Huls Corporation.

There is no particular limitation on the epoxy compound as long as it is a compound having an epoxy group, and triglycidyl isocyanurate and the like are used.

Hydroxyalkylamide is obtained by reacting, for example, a carboxylic acid and/or carboxylic acid ester with β-hydroxyalkylamine in the presence of alkoxide of sodium, potassium, and the like. Examples of the above-mentioned carboxylic acid and carboxylic acid ester include succinic acid, adipic acid, glutaric acid, dimethyl succinate, diethyl succinate, and dimethyl adipate. Examples of the above-mentioned β-hydroxyalkylamine include N-methylethanolamine, diethanolamine, and N-methylpropanolamine. Examples of the above-mentioned hydroxyalkylamide include "PRIMID" series manufactured by EMS-PRIMID.

There is no particular limitation on the amino compound as long as it is a compound having an amino group. Urea, melamine, urea resin, etc. are used for general purposes.

There is no particular limitation on the aliphatic dibasic acid, and dodecanoic diacid, etc. are used for general purposes.

There is also no limitation on the acid anhydride, and trimellitic anhydride, pyromellitic anhydride, etc. are used for general purposes.

The powder coating material of the present invention forms a coating film having a highly smooth surface with few coating defects such as running or sagging of the coating material and pinholes even when exposed to high-temperature coating or long-time post-heating. The coating film is less susceptible to yellowing in a wide range of coating temperatures including low and high temperatures. The high flexibility of the coating film contributes to the high resistance to cracking and peeling of the coating film even when the substrate is worked after being coated. In addition, since the powder coating material of the present invention has the characteristics inherent to polyvinyl acetal powder coating materials, that is, good adhesion to the substrate, and high hardness and impact resistance of the coating film, it does not require pretreatment such as primer coating.

The powder coating material of the present invention can be used in various powder coating processes. Examples of the powder coating processes include fluidized-bed dip coating, electrostatic coating, and flame spray coating. The coating temperature varies depending on the coating process employed and on the degree of polymerization of polyvinyl acetal used. Preferably, it is approximately 100 to 400° C.

A coating film obtained by applying the powder coating material of the present invention has high smoothness, shows very little yellowing, and has high flexibility. The coating film also has high hardness and impact resistance.

Examples of the substrate to be subjected to the coating using the polyvinyl acetal powder coating material of the present invention include metal substrates such as steel tubes and steel sheets. When the powder coating material is applied to these metal substrates, the surfaces of the substrates are, if necessary, be subjected to pretreatments such as degreasing, phosphating, and plating, and primer coating with an epoxy resin or the like, for the purpose of improving the adhesion to the coating films, the corrosion resistance, the appearance thereof, etc. The powder coating material of the present invention also can be used for the coating of earthenware, ceramics, glassware, plastics, etc. The powder coating material of the present invention also can be applied to a substrate, typically a metal substrate, in the above-mentioned powder coating process, so as to obtain a coating film having a multilayer structure. In this case, there is also an option to use other resin layers, if necessary, to form a multilayer structure. A method for forming such a multilayer structure is not particularly limited. For example, the following methods can be used: a method in which the powder coating process is repeated two or more times; and a method in which a mixture of the powder coating material of the present invention and another resin is melted so that the affinity difference between these resins causes a phase separation, and the resulting mixture is applied once to obtain two or more resin layers. Among these methods, the repetition of the powder coating process is more preferred because it does not require any specific consideration for the affinity difference between the resins used.

Examples of the end products to be subjected to the coating using the polyvinyl acetal powder coating material of the present invention include carts (for example, shopping carts, shopping basket holders, dollies and airport baggage carts, and particularly shopping carts), water pipes, metal baskets, chemical tanks, overcoats for home electric appliances, and automobile components. Among them, carts are preferred. A cart coated with the polyvinyl acetal powder coating material of the present invention has a highly smooth coating film with few pinholes, shows very little yellowing, and has a good appearance with few cracks and peelings in a bent portion. The coating film of the cart also has high hardness and impact resistance. In order to produce a cart with the coating film of the powder coating material formed thereon, the cart may be assembled using steel tubes coated with the powder coating material. The coating film may be formed by dipping the cart into the powder coating material.

Hereinafter, the present invention is described in further detail by the following examples, without intending to limit the scope of the present invention thereto. It should be noted that in the following examples, "%" and "parts" denote "% by weight" and "parts by weight", respectively, unless otherwise specified.

The characteristics of each polyvinyl acetal resin and antioxidant were measured according to the following methods.
(Content of Vinyl Ester Units in Polyvinyl Acetal Resin)
The content of vinyl ester units was measured according to JIS K-6728.
(Content of Vinyl Alcohol Units in Polyvinyl Acetal Resin)
The content of vinyl alcohol units was measured according to JIS K-6728.
(Water Content in Polyvinyl Acetal Resin)
The polyvinyl acetal resin was dried in a drier at 105° C. for 3 hours, and the water content thereof was calculated by the following equation: {(the weight of undried resin)−(the weight of dried resin)}/{the weight of undried resin}×100 (%).
(Content of Residual Aldehyde in Polyvinyl Acetal Resin)
The content of residual aldehyde was measured using a headspace gas chromatograph GC-14B (manufactured by Shimadzu Corporation) equipped with a TC-1 column (with an inner diameter of 0.25 mm and a length of 30 m) (manufactured by GL Science Inc.).

The particle diameters of the polyvinyl acetal resins and antioxidants were measured according to the following methods.
(Average Particle Diameters of Agglomerated Particles of Polyvinyl Acetal Resin and Antioxidant)
These average particle diameters were measured with a particle size distribution analyzer SALD-2200 manufactured by Shimadzu Corporation.
(Average Particle Diameter of Primary Particles of Polyvinyl Acetal Resin)
Pictures of three portions of the polyvinyl acetal resin (three pictures thereof) were taken with a scanning electron microscope (SEM) at a magnification of 1000. Then, the diameters of the primary particles that can be determined based on each of the pictures (at least 50 particles for each picture) were measured to calculate the average value thereof. As the diameter of each primary particle, the longest diameter thereof was measured.

(Maximum Particle Diameter of Primary Particles of Polyvinyl Acetal Resin)

The diameter of the largest one of the primary particles observed in the SEM pictures was measured.

Example 1

(Preparation of Polyvinyl Acetal Resin)

1295 g of ion-exchanged water and 105 g of polyvinyl alcohol (PVA-1 with a degree of polymerization of 600 and a degree of saponification of 98 mol %) were put into a 2-liter glass vessel equipped with a reflux condenser, a thermometer and an anchor blade stirrer. Then, the temperature of the whole system was raised to 95° C. so that the polyvinyl alcohol was dissolved completely, and thus an aqueous polyvinyl alcohol solution (with a concentration of 7.5% by weight) was formed. The aqueous polyvinyl alcohol solution thus formed was cooled slowly over a period of about 30 minutes to 10° C. with stirring at a rate of 120 rpm. Then, 66 g of butylaldehyde and 90 ml of hydrochloric acid with a concentration of 20% by weight, as an acid catalyst that was a butyralization catalyst, were added to the solution to initiate the butyralization of polyvinyl alcohol. After the butyralization for 150 minutes, the temperature of the whole system was raised over a period of 60 minutes to 50° C. and maintained at 50° C. for 120 minutes, and then cooled to room temperature. After the filtration of the resin that had been precipitated by the cooling, and the resin was washed with ion-exchanged water (ion-exchanged water in an amount of 100 times the resin). Then, 0.3% by weight of a sodium hydroxide solution was added thereto for neutralization, and they were maintained at 40° C. for 10 hours. The resin was washed again with ion-exchanged water in an amount of 100 times the resin, followed by dehydration. The resin was dried at 40° C. under reduced pressure for 18 hours. Thus, a polyvinyl butyral resin (PVB-1 with a water content of 0.7% by weight) was obtained.

The degree of butyralization, the content of vinyl ester units, and the content of vinyl alcohol units of the obtained polyvinyl butyral resin (PVB-1) were 68 mol %, 2 mol %, and 30 mol %, respectively. The water content and the residual butylaldehyde content of the PVB-1 were 0.7% and 80 ppm by weight, respectively.

(Preparation of Polyvinyl Acetal Resin Powder)

The polyvinyl butyral resin (PVB-1) thus prepared was sieved through a 60-mesh (with a mesh size of 250 μm) metal net to remove particles with diameters of 250 μm or more. Thus, a polyvinyl butyral powder (A-1) was obtained. The average particle diameter of primary particles in the powder (A-1) was 3.5 μm, and the average particle diameter of the powder (A-1) (agglomerated particles) was 80 μm.

(Preparation of Powder Coating Material)

0.5 part of an antioxidant ("IRGANOX 259" (with an average particle diameter of 83 μm) manufactured by Ciba Specialty Chemicals, Inc.: hexamethylene-bis[3-(3,5-di-t-butyl-4-hydroxyphenyl)propionate] (having a melting point of 104° C. to 108° C., and a molecular weight of 639) was added per 100 parts of the powder (A-1) obtained as described above, and they are mixed in a dry blender. Thus, a powder coating material 1 was obtained.

[Application of Powder Coating Material and Evaluation of Obtained Coating Film]

The powder coating material 1 thus prepared was applied and evaluated in the following manner.

(Coating of Iron Sheet with Powder Coating Material)

The surface of an iron sheet with dimensions of 0.2 mm (in thickness)×50 mm×100 mm was degreased by washing with a detergent. Then, the sheet was washed with ion-exchanged water sufficiently, and thus a substrate was obtained. The powder coating material 1 was applied to the surface of the substrate by fluidized-bed dip coating. Specifically, the powder coating material 1 was fed into a tank equipped with a cylindrical-shaped coating chamber (fluidizing chamber) (with a height of 50 cm and a diameter of 30 cm) having a microporous plate at the bottom. Air was introduced from beneath the microporous plate into the coating chamber through the plate so as to fluidize the powder coating material 1. The substrate made of the iron sheet was pre-heated (at a temperature of 300° C. for 10 minutes), and then suspended in the fluidized layer of the powder coating material 1. After 10 seconds, the substrate was taken out of the chamber, and heated at a temperature of 230° C. for 10 minutes. Thus, a coated article was obtained.

The coating film of the coated article thus obtained was evaluated in the following manner. Table 1 shows the results thereof. As for the yellowing and smoothness of the coating film, how the powder coating material applied to the iron sheet with dimensions of 0.2 mm (in thickness)×50 mm×100 mm adhered thereto was observed visually. As for the flexibility, the powder coating material was applied to an iron rod of 5 mm in diameter and 20 cm in length in the same manner as the above-mentioned iron sheet. After confirming that the rod was cooled sufficiently, it was bent using a vise, and the coating film in the bent portion was observed visually. The yellowing, smoothness, and flexibility were evaluated based on the following criteria.

(Yellowing)
A: Colorless with no yellowing
B: Slightly yellowed but no problem in practical use
C: Discolored into yellow with poor appearance (Smoothness of Coating Film)
A: The coating film is highly smooth and no running or sagging nor pinholes are observed
B: The coating film runs or sags slightly but no pinholes are observed therein
C: The coating film runs or sags greatly and pinholes are observed (Flexibility)
A: Neither peeling nor cracking of the coating film is observed when the substrate is bent
B: Minor cracking is observed on the surface of the coating film when the substrate is bent but the base material of the substrate is not exposed
C: Peeling and cracking are observed partially in the coating film when the substrate is bent
D: Serious peeling and cracking are observed when the substrate is bent Example 2

A polyvinyl butyral resin (PVB-2) was obtained in the same manner as in Example 1, except that polyvinyl alcohol (PVA-2 with a degree of polymerization of 300 and a degree of saponification of 95 mol %) was used instead of PVA-1. The degree of butyralization, the content of vinyl ester units, and the content of vinyl alcohol units of the PVB-2 were 75 mol %, 5 mol %, and 20 mol %, respectively. The water content and the residual butylaldehyde content of the PVB-2 were 0.8% and 100 ppm by weight, respectively.

Next, the obtained PVB-2 was sieved in the same manner as in Example 1 so as to remove particles with diameters of 250 μm or more. Thus, a polyvinyl butyral powder (A-2) was obtained. The average particle diameter of primary particles in the powder (A-2) was 3.2 µm, and the average particle diameter of the powder (A-2) (agglomerated particles) was 60 µm.

Next, a powder coating material 2 was obtained in the same manner as in Example 1, except that the powder (A-2) prepared as described above was used instead of the powder (A-1).

Furthermore, the powder coating material was applied in the same manner as in Example 1 to prepare a coated article, and the coating film of the coated article was evaluated. Table 1 shows the results thereof.

Example 3

A polyvinyl butyral resin (PVB-3) was obtained in the same manner as in Example 1, except that polyvinyl alcohol (PVA-3 with a degree of polymerization of 1000 and a degree of saponification of 98 mol %) was used instead of PVA-1. The degree of butyralization, the content of vinyl ester units, and the content of vinyl alcohol units of the PVB-3 were 78 mol %, 2 mol %, and 20 mol %, respectively. The water content and the residual butylaldehyde content of the PVB-3 were 0.9% and 100 ppm by weight, respectively.

Next, the obtained PVB-3 was sieved in the same manner as in Example 1 so as to remove particles with diameters of 250 mm or more. Thus, a polyvinyl butyral powder (A-3) was obtained. The average particle diameter of primary particles in the powder (A-3) was 3.0 µM, and the average particle diameter of the powder (A-3) (agglomerated particles) was 80 µm.

Next, a powder coating material 3 was obtained in the same manner as in Example 1, except that the powder (A-3) prepared as described above was used instead of the powder (A-1).

Furthermore, the powder coating material was applied in the same manner as in Example 1 to prepare a coated article, and the coating film of the coated article was evaluated. Table 1 shows the results thereof.

Example 4

A polyvinyl butyral resin (PVB-4) was obtained in the same manner as in Example 1, except that polyvinyl alcohol (PVA-4 with a degree of polymerization of 200 and a degree of saponification of 98 mol %) was used instead of PVA-1. The degree of butyralization, the content of vinyl ester units, and the content of vinyl alcohol units of the PVB-4 were 78 mol %, 2 mol %, and 20 mol %, respectively. The water content and the residual butylaldehyde content of the PVB-4 were 0.7% and 90 ppm by weight, respectively.

Next, the obtained PVB-4 was sieved in the same manner as in Example 1 so as to remove particles with diameters of 250 µm or more. Thus, a polyvinyl butyral powder (A-4) was obtained. The average particle diameter of primary particles in the powder (A-4) was 3.0 µm, and the average particle diameter of the powder (A-4) (agglomerated particles) was 80 µm.

Next, a powder coating material 4 was obtained in the same manner as in Example 1, except that the powder (A-4) prepared as described above was used instead of the powder (A-1).

Furthermore, the powder coating material was applied in the same manner as in Example 1 to prepare a coated article, and the coating film of the coated article was evaluated. Table 1 shows the results thereof.

Example 5

A powder coating material 5 was obtained in the same manner as in Example 1, except that 0.5 part of "IRGANOX 1098" (with an average particle diameter of 59 µm) manufactured by Ciba Specialty Chemicals, Inc.: N,N'-hexane-1,6-diylbis[3-(3,5-di-t-butyl-4-hydroxyphenyl)propionamide] (having a melting point of 156° C. to 161° C., and a molecular weight of 637) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Example 6

A powder coating material 6 was obtained in the same manner as in Example 1, except that 0.05 part of "IRGANOX 259" (with an average particle diameter of 83 µm) manufactured by Ciba Specialty Chemicals, Inc.: hexamethylene-bis [3-(3,5-di-t-butyl-4-hydroxyphenyl)propionate] (having a melting point of 104° C. to 108° C., and a molecular weight of 639) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Example 7

A powder coating material 7 was obtained in the same manner as in Example 1, except that 0.2 part of "IRGANOX 259" (with an average particle diameter of 83 µm) manufactured by Ciba Specialty Chemicals, Inc.: hexamethylene-bis [3-(3,5-di-t-butyl-4-hydroxyphenyl)propionate] (having a melting point of 104° C. to 108° C., and a molecular weight of 639) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Example 8

A powder coating material 8 was obtained in the same manner as in Example 1, except that 1.0 part of "IRGANOX 259" (with an average particle diameter of 83 µm) manufactured by Ciba Specialty Chemicals, Inc.: hexamethylene-bis [3-(3,5-di-t-butyl-4-hydroxyphenyl)propionate] (having a melting point of 104° C. to 108° C., and a molecular weight of 639) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Example 9

A powder coating material 9 was obtained in the same manner as in Example 1, except that 3.0 parts of "IRGANOX 259" (with an average particle diameter of 83 µm) manufactured by Ciba Specialty Chemicals, Inc.: hexamethylene-bis [3-(3,5-di-t-butyl-4-hydroxyphenyl)propionate] (having a melting point of 104° C. to 108° C., and a molecular weight of 639) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Example 10

A powder coating material 10 was obtained in the same manner as in Example 1, except that 4.8 parts of "IRGANOX 259" (with an average particle diameter of 83 μm) manufactured by Ciba Specialty Chemicals, Inc.: hexamethylene-bis[3-(3,5-di-t-butyl-4-hydroxyphenyl)propionate] (having a melting point of 104° C. to 108° C., and a molecular weight of 639) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Example 11

A powder coating material 11 was obtained in the same manner as in Example 1, except that 1.0 part of "Sumilizer BBM-S" (with an average particle diameter of 63 μm) manufactured by Sumitomo Chemical Co., Ltd.: 4,4'-butylidenebis(6-t-butyl-3-methylphenol) (having a melting point of 209° C., and a molecular weight of 383) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Example 12

A powder coating material 12 was obtained in the same manner as in Example 1, except that 1.0 part of "Adeka Stab AO-80" (with an average particle diameter of 74 μm) manufactured by ADEKA Corporation: 3,9-bis{1,1-dimethyl-2-(3-(3-t-butyl-4-hydroxy-5-methylphenyl)propionyloxy)ethyl}2,4,8,10-tetraoxaspiro[5,5]-undecane (having a melting point of 110° C. to 120° C., and a molecular weight of 741) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Comparative Example 1

The powder (A-1) obtained in Example 1 was used directly as a powder coating material 13.

Furthermore, the powder coating material was applied in the same manner as in Example 1 to prepare a coated article, and the coating film of the coated article was evaluated. Table 1 shows the results thereof.

Comparative Example 2

A powder coating material 14 was obtained in the same manner as in Example 1, except that 0.5 part of "BHT" (with an average particle diameter of 77 μm): 3,5-di-t-butyl-4-hydroxytoluene (having a melting point of 71° C., and a molecular weight of 220) was added per 100 parts by weight of the powder (A-1) obtained in Example 1.

Furthermore, the powder coating material was applied in the same manner as in Example 1 to prepare a coated article, and the coating film of the coated article was evaluated. Table 1 shows the results thereof.

Comparative Example 3

A powder coating material 15 was obtained in the same manner as in Example 1, except that 7 parts of "IRGANOX 259" (with an average particle diameter of 83 μm) manufactured by Ciba Specialty Chemicals, Inc.: hexamethylene-bis[3-(3,5-di-t-butyl-4-hydroxyphenyl)propionate] was added per 100 parts by weight of the powder (A-1) obtained in Example 1.

Furthermore, the powder coating material was applied in the same manner as in Example 1 to prepare a coated article, and the coating film of the coated article was evaluated. Table 1 shows the results thereof.

Comparative Example 4

A powder coating material 16 was obtained in the same manner as in Example 1, except that 0.015 part of "IRGANOX 259" (with an average particle diameter of 83 μm) manufactured by Ciba Specialty Chemicals, Inc.: hexamethylene-bis[3-(3,5-di-t-butyl-4-hydroxyphenyl)propionate] was added per 100 parts by weight of the powder (A-1) obtained in Example 1.

Furthermore, the powder coating material was applied in the same manner as in Example 1 to prepare a coated article, and the coating film of the coated article was evaluated. Table 1 shows the results thereof.

Comparative Example 5

A powder coating material 17 was obtained in the same manner as in Example 1, except that 0.5 part of "IRGAMOD 295" (with an average particle diameter of 89 μm) manufactured by Ciba Specialty Chemicals, Inc.: diethyl{[3,5-bis(1,1-dimethylethyl)-4-hydroxyphenyl]methyl}phosphonate (having a melting point of 116° C. to 121° C., and a molecular weight of 356) was added per 100 parts by weight of the powder (A-1) obtained in Example 1.

Furthermore, the powder coating material was applied in the same manner as in Example 1 to prepare a coated article, and the coating film of the coated article was evaluated. Table 1 shows the results thereof.

Comparative Example 6

A powder coating material 18 was obtained in the same manner as in Example 1, except that 0.5 part of "IRGANOX 1076" (with an average particle diameter of 81 μm) manufactured by Ciba Specialty Chemicals, Inc.: n-octadecyl-β-(4'-hydroxy-3',5'-di-t-butylphenyl)propionate (having a melting point of 50° C. to 53° C., and a molecular weight of 531) was added per 100 parts of the powder (A-1) obtained in Example 1.

Furthermore, the powder coating material was applied in the same manner as in Example 1 to prepare a coated article, and the coating film of the coated article was evaluated. Table 1 shows the results thereof.

Comparative Example 7

A powder coating material 19 was obtained in the same manner as in Example 1, except that 0.5 part of "IRGANOX 1330" (with an average particle diameter of 78 μm) manufactured by Ciba Specialty Chemicals, Inc.: 3,3',3",5,5',5"-hexa-t-butyl-α,α',α"mesitylene-2,4,6-triyl)tri-p-cresol (having a melting point of 240° C. to 245° C., and a molecular weight of 775) was added per 100 parts by weight of the powder (A-1) obtained in Example 1.

Furthermore, the powder coating material was applied in the same manner as in Example 1 to prepare a coated article, and the coating film of the coated article was evaluated. Table 1 shows the results thereof.

TABLE 1

| | Powder | | | | | Antioxidant | | | Physical properties of coating film | | |
|---|---|---|---|---|---|---|---|---|---|---|---|
| | Powder coating material | Degree of polymer-ization | Vinyl alcohol unit (mol %) | Vinyl ester unit (mol %) | Vinyl acetal unit (mol %) | Type of anti-oxidant | Molecular weight of anti-oxidant | Melting point of anti-oxidant (° C.) | Amount of anti-oxidant added (parts) | Yellow-ing | Smooth-ness of coating film | Flexi-bility |
| Example 1 | Powder coating material 1 | 600 | 30 | 2 | 68 | IRGANOX 259 | 639 | 104-108 | 0.5 | A | A | A |
| Example 2 | Powder coating material 2 | 300 | 20 | 5 | 75 | IRGANOX 259 | 639 | 104-108 | 0.5 | A | A | A |
| Example 3 | Powder coating material 3 | 1000 | 20 | 2 | 78 | IRGANOX 259 | 639 | 104-108 | 0.5 | A | A | A |
| Example 4 | Powder coating material 4 | 200 | 20 | 2 | 78 | IRGANOX 259 | 639 | 104-108 | 0.5 | A | A | A |
| Example 5 | Powder coating material 5 | 600 | 30 | 2 | 68 | IRGANOX 1098 | 637 | 156-161 | 0.5 | A | A | A |
| Example 6 | Powder coating material 6 | 600 | 30 | 2 | 68 | IRGANOX 259 | 639 | 104-108 | 0.05 | B | A | B |
| Example 7 | Powder coating material 7 | 600 | 30 | 2 | 68 | IRGANOX 259 | 639 | 104-108 | 0.2 | A | A | A |
| Example 8 | Powder coating material 8 | 600 | 30 | 2 | 68 | IRGANOX 259 | 639 | 104-108 | 1.0 | A | A | A |
| Example 9 | Powder coating material 9 | 600 | 30 | 2 | 68 | IRGANOX 259 | 639 | 104-108 | 3.0 | A | A | A |
| Example 10 | Powder coating material 10 | 600 | 30 | 2 | 68 | IRGANOX 259 | 639 | 104-108 | 4.8 | A | B | B |
| Example 11 | Powder coating material 11 | 600 | 30 | 2 | 68 | Sumilizer BBM-S | 383 | 209 | 1.0 | A | A | B |
| Example 12 | Powder coating material 12 | 600 | 30 | 2 | 68 | AO-80 | 741 | 110-120 | 1.0 | A | A | A |
| Comparative Example 1 | Powder coating material 13 | 600 | 30 | 2 | 68 | None | — | — | — | C | A | D |
| Comparative Example 2 | Powder coating material 14 | 600 | 30 | 2 | 68 | BHT | 220 | 71 | 0.5 | A | A | D |
| Comparative Example 3 | Powder coating material 15 | 600 | 30 | 2 | 68 | IRGANOX 259 | 639 | 104-108 | 7 | A | B | C |
| Comparative Example 4 | Powder coating material 16 | 600 | 30 | 2 | 68 | IRGANOX 259 | 639 | 104-108 | 0.015 | B | A | C |
| Comparative Example 5 | Powder coating material 17 | 600 | 30 | 2 | 68 | IRGAMOD 295 | 356 | 116-121 | 0.5 | A | A | C |
| Comparative Example 6 | Powder coating material 18 | 600 | 30 | 2 | 68 | IRGANOX 1076 | 531 | 50-53 | 0.5 | A | C | C |
| Comparative Example 7 | Powder coating material 19 | 600 | 30 | 2 | 68 | IRGANOX 1330 | 775 | 240-245 | 0.5 | A | C | D |

As shown in Table 1, it was found that, in contrast to Comparative Examples 1 to 7, satisfactory coated articles could be obtained in Examples 1 to 12, in which no yellowing was observed, no running or sagging was observed on the smooth surfaces of the articles, and in addition, neither cracking nor peeling was observed even when the articles were bent.

INDUSTRIAL APPLICABILITY

The powder coating material of the present invention is suitable for the coating of metal substrates such as steel tubes and steel sheets. Examples of end products to be coated with the powder coating material include carts (for example, shopping carts, shopping basket holders, dollies and airport baggage carts, and particularly shopping carts), water pipes, metal baskets, chemical tanks, overcoats for home electric appliances, and automobile components. The powder coating material of the present invention also can be used for molding processes such as rotational molding and compression molding.

The invention claimed is:

1. A polyvinyl acetal powder coating material comprising:
a polyvinyl acetal resin; and
0.2 to 3% by weight of an antioxidant relative to the weight of the polyvinyl acetal resin,
wherein
the antioxidant is at least one selected from the group consisting of hexamethylene-bis [3-(3,5-di-t-butyl-4-hydroxyphenyl)propionate, N,N'-hexane-1,6-diylbis [3-(3,5-di-t-butyl-4-hydroxyphenyl)propionamide, 4,4'-butylidenebis(6-t-butyl-3-methylphenol) and 3,9-bis {1,1-dimethyl-2-[β(3-t-butyl-4-hydroxy-5-methylphenyl)propionyloxy)ethyl}2,4,8,10-tetraoxaspiro [5,5]-undecane.

2. The polyvinyl acetal powder coating material according to claim 1, wherein the polyvinyl acetal resin is a polyvinyl acetal resin having a water content of 2.5% by weight or less, and a residual aldehyde content of 1000 ppm by weight or less.

3. The polyvinyl acetal powder coating material according to claim 1, wherein the polyvinyl acetal resin is a polyvinyl acetal resin obtained by acetalizing a vinyl alcohol polymer with an aldehyde having 2 to 6 carbon atoms.

4. The polyvinyl acetal powder coating material according to claim 1, wherein the polyvinyl acetal resin is a polyvinyl butyral resin.

5. The polyvinyl acetal powder coating material according to claim 1, wherein the polyvinyl acetal resin and the antioxidant are dry-blended.

6. A coating film obtained by applying the polyvinyl acetal powder coating material according to claim 1.

7. A cart coated with the polyvinyl acetal powder coating material according to claim 1.

8. The polyvinyl acetal powder coating material according to claim 1, wherein the antioxidant is at least one of hexamethylene-bis[3-(3,5-di-t-butyl-4-hydroxyphenyl)propionate] and N,N'-hexane-1,6-diylbis[3-(3,5-di-t-butyl-4-hydroxyphenyl)propionamide].

9. The polyvinyl acetal powder coating material according to claim 1, further comprising a heat stabilizer.

10. The polyvinyl acetal powder coating material according to claim 9, wherein the heat stabilizer is at least one selected from the group consisting of a phosphorous heat stabilizer, a hydroxylamine heat stabilizer and a sulfur heat stabilizer.

11. The polyvinyl acetal powder coating material according to claim 1, wherein an average particle diameter of the antioxidant is 150 μm or less and a maximum particle diameter of the antioxidant is 250 μm or less.

12. The polyvinyl acetal powder coating material according to claim 2, wherein the residual aldehyde content is from 5 ppm to 120 ppm.

13. The polyvinyl acetal powder coating material according to claim 1, wherein a content of vinyl acetal units of the polyvinylacetal resin is from 40 to 85 mol % relative to a total of the content of vinyl acetal units, a content of vinyl ester units, and a content of vinyl alcohol units in the polyvinyl acetal resin.

14. The polyvinyl acetal powder coating material according to claim 1, wherein a content of vinyl ester units is 0.1 to 30 mol% and a content of vinyl alcohol units is 10 to 50 mol% relative to a total of the content of vinyl acetal units, the content of vinyl ester units, and the content of vinyl alcohol units in the polyvinyl acetal resin.

15. The polyvinyl acetal powder coating material according to claim 1, wherein the polyvinyl acetal resin comprises agglomerated particles of primary particles, wherein an average particle diameter of the agglomerated particles is 150 μm or less and a maximum particle diameter of the agglomerated particles is 250 μm or less.

16. The polyvinyl acetal powder coating material according to claim 15, wherein an average particle diameter of the primary particles is 5 μm or less and a maximum particle diameter of the primary particles 10 μm or less.

* * * * *